US012332471B2

(12) United States Patent
Hung et al.

(10) Patent No.: US 12,332,471 B2
(45) Date of Patent: Jun. 17, 2025

(54) CURVED BACKLIGHT MODULE AND DISPLAY DEVICE

(71) Applicant: Radiant Opto-Electronics Corporation, Kaohsiung (TW)

(72) Inventors: Hui-Hua Hung, Kaohsiung (TW); Ying-Ting Chen, Kaohsiung (TW); Sung-Fu Wu, Kaohsiung (TW); Yi-Jen Chiu, Kaohsiung (TW)

(73) Assignee: Radiant Opto-Electronics Corporation, Kaohsiung (TW)

( * ) Notice: Subject to any disclaimer, the term of this patent is extended or adjusted under 35 U.S.C. 154(b) by 34 days.

(21) Appl. No.: 18/309,791

(22) Filed: Apr. 29, 2023

(65) Prior Publication Data

US 2023/0375771 A1 Nov. 23, 2023

Related U.S. Application Data

(63) Continuation of application No. PCT/CN2022/094252, filed on May 20, 2022.

(51) Int. Cl.
*F21V 8/00* (2006.01)
(52) U.S. Cl.
CPC ......... *G02B 6/0051* (2013.01); *G02B 6/0036* (2013.01); *G02B 6/0088* (2013.01)
(58) Field of Classification Search
CPC ............. G02B 6/0051; G02F 1/133322; G02F 1/133608; G02F 1/133603
See application file for complete search history.

(56) References Cited

U.S. PATENT DOCUMENTS

| 9,113,553 B2 * | 8/2015 | An ........................ H05K 5/0017 |
| 9,338,905 B2 * | 5/2016 | Ahn ..................... H05K 5/0017 |
| 9,483,964 B2 * | 11/2016 | Choi ........................ G09F 9/30 |
| 2007/0146569 A1 * | 6/2007 | Nouchi ............. G02F 1/133602 |
| | | 349/64 |
| 2014/0307474 A1 * | 10/2014 | Kim ..................... G02B 6/0093 |
| | | 362/613 |

(Continued)

FOREIGN PATENT DOCUMENTS

| CN | 103777382 | 5/2014 |
| CN | 204717609 | 10/2015 |

(Continued)

*Primary Examiner* — Eric T Eide (57) ABSTRACT

A curved backlight module includes a frame unit, a light source, and a diffuser plate. The frame unit includes a back frame, a curvature fixing member combined with the back frame, and at least one first positioning structure. The at least one first positioning structure is disposed on anyone of the back frame or the curvature fixing member. The curvature fixing member presses the diffuser plate so that at least a portion of the diffuser plate has the same curvature with the curvature fixing member. The diffuser plate has at least one second positioning structure, the at least one first positioning structure of the frame unit is combined with the at least one second positioning structure of the diffuser plate to limit the diffuser plate and simplify the structure of the positioning elements. The curvature fixing member stably maintains the curvature of the diffuser plate, thereby improving the overall structural stability and optical quality. The present invention further provides a display device including the curved backlight module.

13 Claims, 12 Drawing Sheets

(56) References Cited

U.S. PATENT DOCUMENTS

2016/0216435 A1* 7/2016 Park .................... G02B 6/0078

FOREIGN PATENT DOCUMENTS

| | | |
|---|---|---|
| CN | 105276444 | 1/2016 |
| CN | 105824149 | 8/2016 |
| CN | 208477267 | 2/2019 |
| CN | 109975915 | 7/2019 |
| CN | 209514255 | 10/2019 |
| CN | 111199681 | 5/2020 |
| CN | 114296271 | 4/2022 |
| JP | 2008304535 | 12/2008 |
| JP | 2009063701 | 3/2009 |
| JP | 2009093000 | 4/2009 |

* cited by examiner

CURVED BACKLIGHT MODULE AND DISPLAY DEVICE

RELATED APPLICATIONS

This application is a continuation application of International Application No. PCT/CN2022/094252, filed on May 20, 2022, which claims priority to China Application Serial Number 202210353775.1, filed on Apr. 6, 2022. The entire disclosures of all the above applications are hereby incorporated by reference.

FIELD OF THE INVENTION

The present invention relates to an optical element, particularly a curved backlight module with a narrow bezel and a display device including the curved backlight module.

BACKGROUND OF THE INVENTION

The assembly and positioning structure of the conventional direct-lit backlight module usually uses parts such as spacers or positioning blocks to fix the upper side, left and right sides of the diffuser plate and the optical film to achieve the purpose of positioning. However, as the requirements for narrow bezels limit the structural space around the backlight module, the structure or size of the aforementioned spacers or positioning blocks no longer meet the current space design, resulting in no further breakthroughs in the narrow bezel architecture.

In addition, in the curved backlight module, the molding accuracy of the curved diffuser plate is not easy to control, and the mass production cost is relatively high. Therefore, the current designed of the conventional diffuser plate is still a flat shape. However, when the flat diffuser plate assembled into a curved backlight module, there is a large rebound stress generated due to the structural characteristics of the diffuser plate itself, which will cause the instability of the diffuser plate in the curved segment, and further oppress the optical film and affect the optical quality.

SUMMARY OF THE INVENTION

One object of the present invention is to provide a curved backlight module with narrow bezel.

The curved backlight module comprises a frame unit, a light source, and a diffuser plate. The frame unit includes a back frame, a curvature fixing member combined with the back frame, and at least one first positioning structure, the at least one first positioning structure is arranged on the back frame or the curvature fixing member. The light source is carried on the back frame. The diffuser plate is carried on the back frame and located on the light emitting side of the light source. The curvature fixing member presses the diffuser plate, so at least a portion of the diffuser plate forms the same curvature as the curvature fixing member. The diffuser plate has at least one second positioning structure, and the at least one first positioning structure of the frame unit is combined with the at least one second positioning structure of the diffuser plate to limit the diffuser plate.

In a preferable embodiment, the back frame has a plate body portion carrying the light source, and a side wall portion arranged on a periphery of the plate body portion for carrying the diffuser plate. The curvature fixing member has a main body portion arranged outside the side wall portion of the back frame, and at least one pressing portion extending from the main body portion and pressing the diffuser plate to a top of the side wall portion.

In a preferable embodiment, the at least one second positioning structure of the diffuser plate is in the shape of a groove recessed from an edge of the diffuser plate inwardly, and the at least one first positioning structure is a protrusion structure located on the main body portion or the pressing portion of the curvature fixing member and protruding toward the diffuser plate and extending into the at least one second positioning structure.

In a preferable embodiment, the curvature fixing member has a concave portion, and the surface of the concave portion is not higher than the surface of the diffuser plate or is coplanar with the surface of the diffuser plate. The curved backlight module further comprises a film unit stacked on the diffuser plate, and the film unit has a positioning portion extending in the concave portion.

In a preferable embodiment, the number of the first positioning structure is one, and the first positioning structure is corresponding to a central position of a curved section which is formed on the back frame.

In a preferable embodiment, the at least one second positioning structure of the diffuser plate is in the shape of a groove recessed from an edge of the diffuser plate inwardly, and the at least one first positioning structure is a protrusion structure located on the side wall portion of the back frame and protruding toward the diffuser plate and extending into the at least one second positioning structure.

In a preferable embodiment, the pressing portion of the curvature fixing member has two layers of sheets spaced apart from each other, and the at least one first positioning structure is a protrusion structure arranged between the two sheets. The at least one second positioning structure of the diffuser plate is in the shape of a groove recessed from an edge of the diffuser plate inwardly, the edge of the diffuser plate is extended between the two sheets of the curvature fixing member, and the at least one first positioning structure is extended into the at least one second positioning structure.

In a preferable embodiment, the pressing portion of the curvature fixing member extends along an extending direction away from the main body portion, and the width of the pressing portion overlapping with the diffuser plate in the extending direction is greater than the width of a gap between the diffuser plate and the side wall portion of the back frame.

In a preferable embodiment, the back frame has a plate body portion carrying the light source, and a side wall portion arranged on a periphery of the plate body portion for carrying the diffuser plate. The curvature fixing member has an upper frame segment corresponding to a top edge of the side wall portion, and a lower frame segment corresponding to a bottom edge of the side wall portion. The at least one first positioning structure is connected to a central position of the upper frame segment and a central position of the lower frame segment. The at least one second positioning structure of the diffuser plate is in the shape of a groove recessed from an edge of the diffuser plate inwardly. The side wall portion of the back frame has at least one engaging groove corresponding to the at least one second positioning structure, and the at least one first positioning structure is embedded in the at least one second positioning structure and the at least one engaging groove.

In a preferable embodiment, the curvature fixing member further has two reinforcing segments respectively connected to two ends of the upper frame segment and two ends of the lower frame segment. The side wall portion of the back frame further has two channels respectively located on both sides of the at least one engaging groove, the diffuser plate further has two auxiliary positioning structures respectively located on both sides of the at least one second positioning structure and corresponding to the two channels, and the two reinforcing segments of the curvature fixing member are respectively accommodated in the two channels and the two auxiliary positioning structures.

In a preferable embodiment, the at least one first positioning structure has a first structure width, the reinforcing segment of the curvature fixing member has a second structural width, the engaging groove of the back frame has a first notch width, each of the channels of the back frame has a second notch width. The difference between the first notch width and the first structure width is smaller than the difference between the second notch width and the second structure width.

In a preferable embodiment, the at least one second positioning structure of the diffuser plate has a third notch width, the auxiliary positioning structure of the diffuser plate has a fourth notch width. The difference between the third notch width and the first structure width is smaller than the difference between the fourth notch width and the second structure width.

Another object of the present invention is to provide a display device which comprises the curved backlight module as described above, and a display panel arranged on the backlight module.

The characteristic of the present invention is that the at least one first positioning structure of the frame unit cooperates with the at least one second positioning structure of the diffuser plate to achieve the effect of positioning the diffuser plate and simplify the positioning components. The curvature fixing member stably maintains the curvature of the diffuser plate and improving the overall structural stability and optical quality.

DETAILED DESCRIPTION OF THE INVENTION

The detailed description and preferred embodiments of the invention will be set forth in the following content and provided for people skilled in the art to understand the characteristics of the invention.

Figure 1:
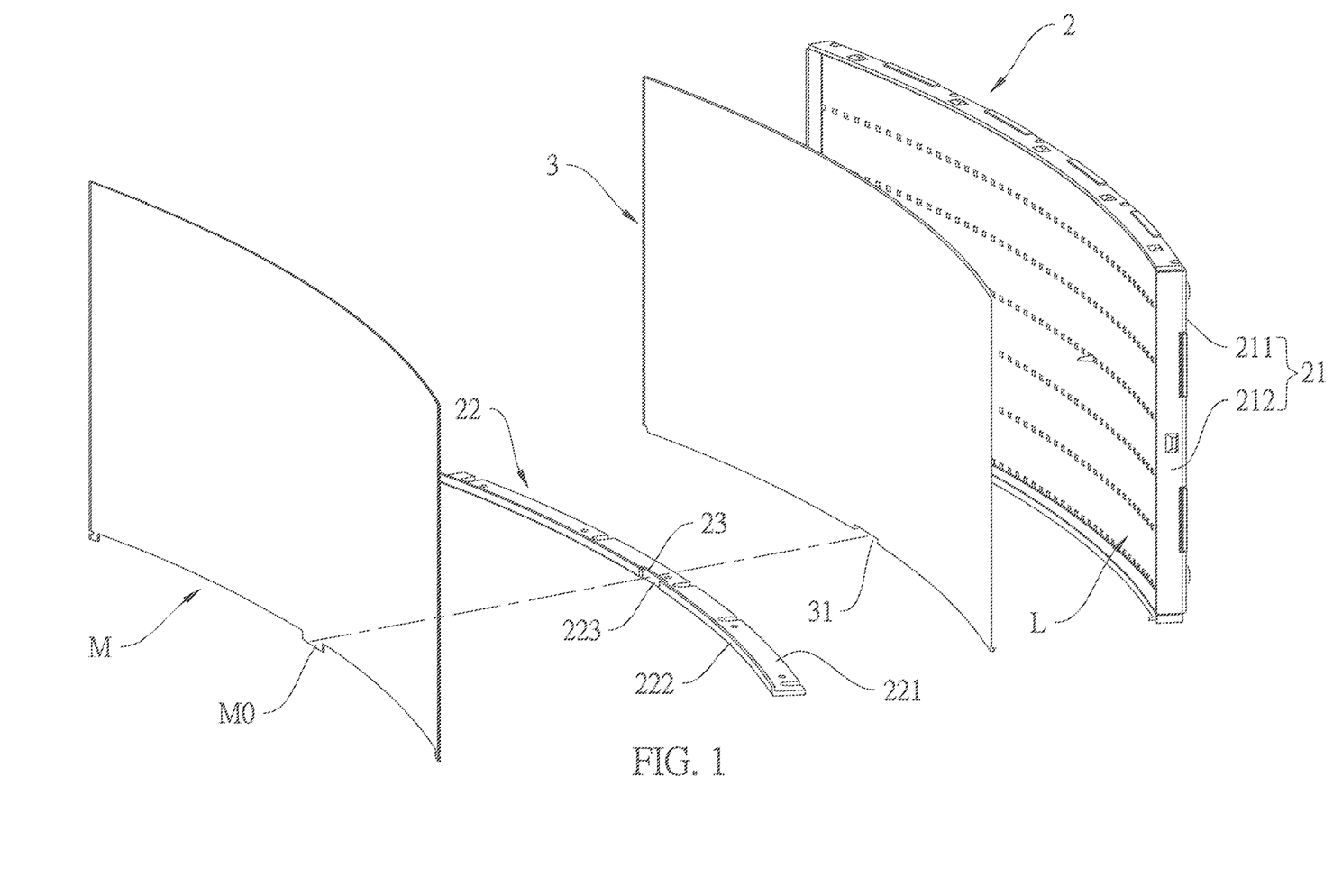
FIG. 1 is an exploded diagram of a curved backlight module according to a first preferred embodiment of this invention.
Figure 2:
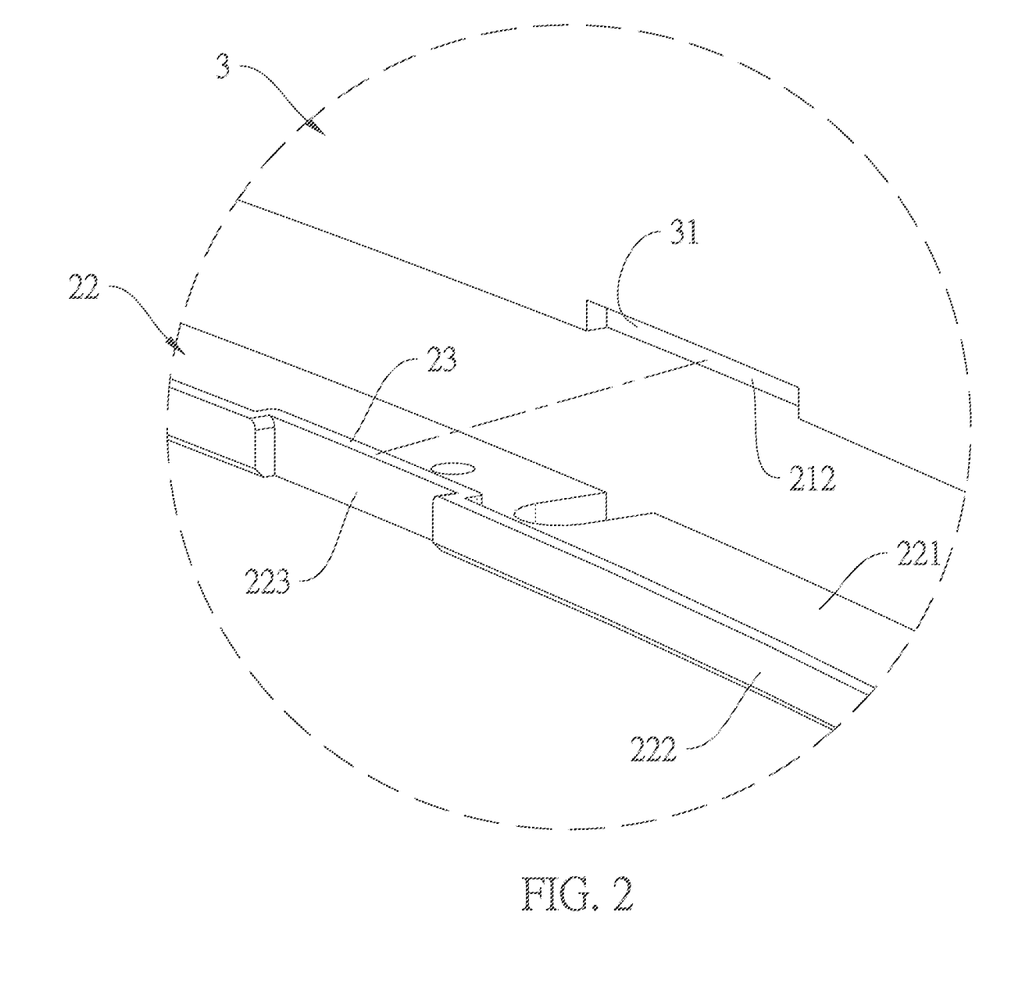
FIG. 2 is a partial perspective diagram to assist in explaining FIG. 1.

Referring to FIG. 1 and FIG. 2, it is a first preferred embodiment of a curved backlight module of the present invention. The curved backlight module comprises a frame unit 2, a diffuser plate 3, a light source L, and a film unit M.

The frame unit 2 includes a back frame 21, a curvature fixing member 22 combined with the back frame 21, and a first positioning structure 23. The back frame 21 has a plate body portion 211, and a side wall portion 212 disposed on a periphery of the plate body portion 211. The light source L is carried on the plate body portion 211. The diffuser plate 3 is carried on the side wall portion 212 and located at the light emitting side of the light source L.

The curvature fixing member 22 has a main body portion 221, a pressing portion 222 extending from the main body portion 221, and a concave portion 223 located on the pressing portion 222. In this embodiment, the first positioning structure 23 is disposed on the pressing portion 222 of the curvature fixing member 22. In this embodiment, the first positioning structure 23 is disposed on the pressing portion 222 of the curvature fixing member 22, the curvature fixing member 22 corresponds to the back frame 21 to form a curved section, and the first positioning structure 23 corresponds to a central position of the curved section. The first positioning structure 23 is a protrusion structure protruding toward the diffuser plate 3, and the position of the concave portion 223 is corresponding to the first positioning structure 23. The diffuser plate 3 has a second positioning structure 31, which is in the shape of a groove recessed from an edge of the diffuser plate inwardly. More specifically, when the first positioning structure 23 of the curvature fixing member 22 and the second positioning structure 31 of the diffuser plate 3 are assembled and positioned with each other, the second positioning structure 31 of the diffuser plate 3 can be used as a positioning point, and two sides of the diffuser plate 3 relative to the second positioning structure 31 can naturally fit the pressing portion 222 of the curvature fixing member 22 to form a curved shape.

Figure 3:
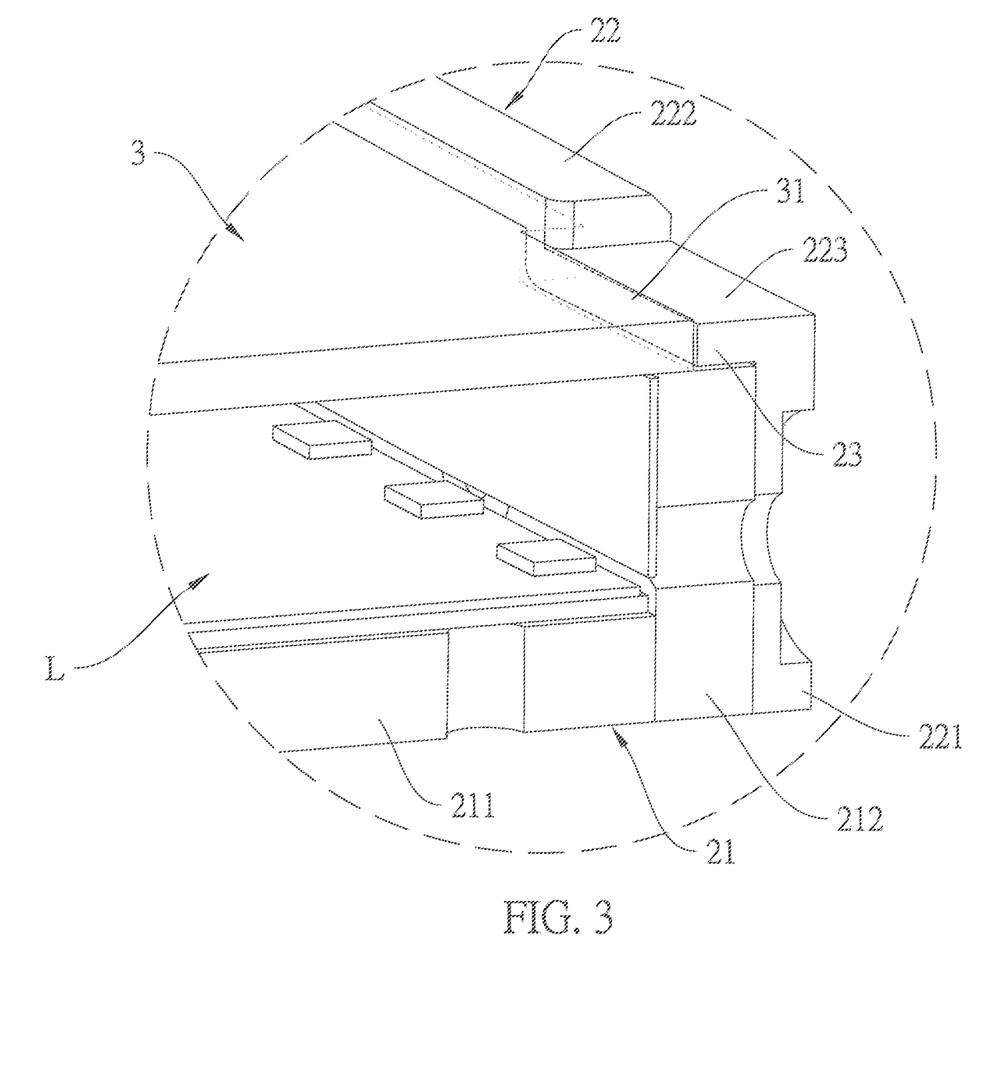
FIG. 3 is a partial sectional diagram to illustrate the relative position of the assembled components in FIG. 1.
Figure 4:
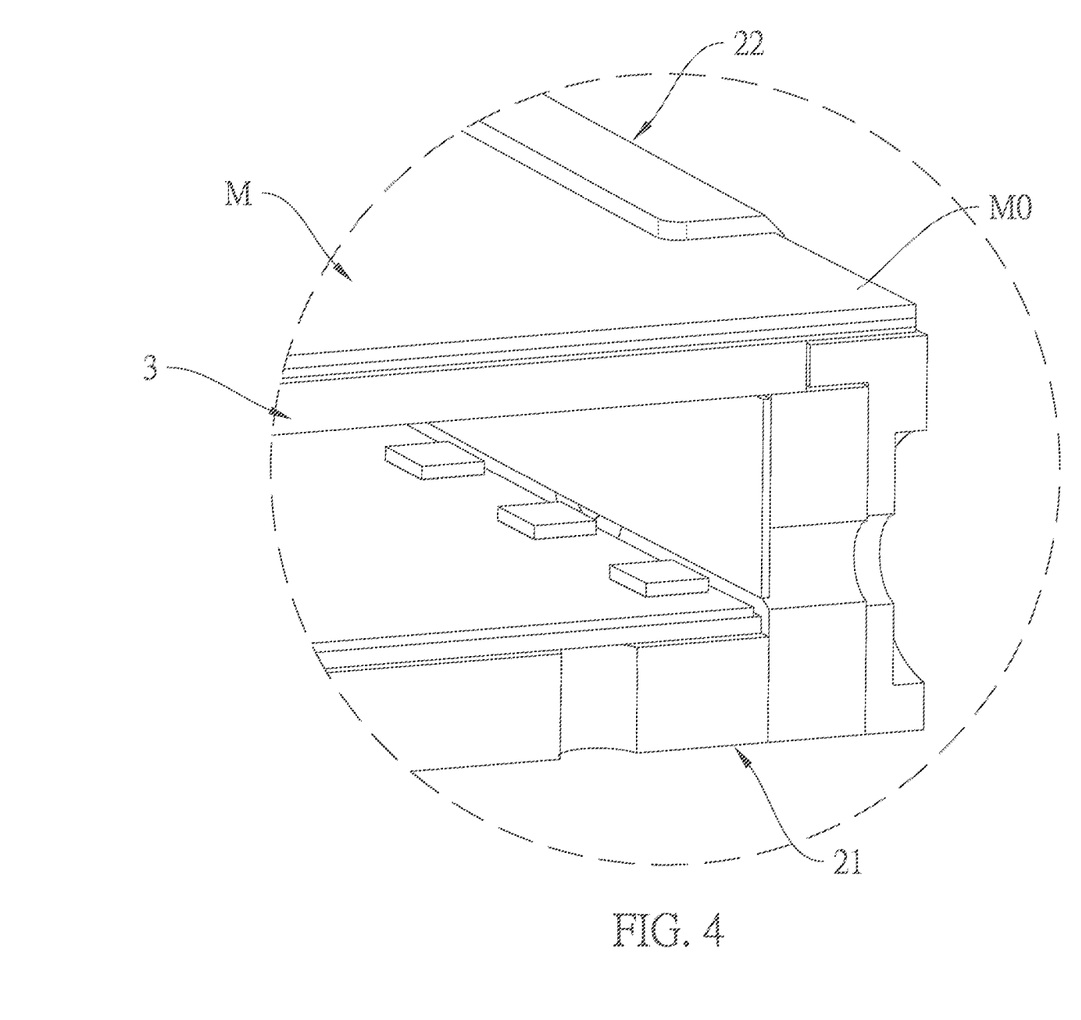
FIG. 4 is a partial sectional diagram to illustrate the structure in which a film unit is placed in FIG. 3.

When the curved backlight module is assembled, the diffuser plate 3 is placed on the side wall portion 212 of the back frame 21 first, and then the curvature fixing member 22 is combined on the diffuser plate 3. More specifically, as shown in FIG. 3, when the curvature fixing member 22 is disposed on the diffuser plate 3, the first positioning structure 23 on the curvature fixing member 22 is extended into the second positioning structure 31 of the diffuser plate 3. In this way, the diffuser plate 3 is limited laterally. After the curvature fixing member 22 is combined with the diffuser plate 3, the main body portion 221 of the curvature fixing member 22 is attached to the outer side of the side wall portion 212 of the back frame 21, and the pressing portion 222 of the curvature fixing member 22 is used to press the diffuser plate 3 onto a top edge of the side wall portion 212. In this way, the pressed part of the diffuser plate 3 will form the same curvature as the curvature fixing member 22. Next, the curvature fixing member 22 is fixed on the back frame 21. For example, methods such as screwing, riveting, buckling or sticking can be used, but not limited to the aforementioned methods. After the curvature fixing member 22 is combined with the diffuser plate 3, it can be seen that the surface of the concave portion 223 is not higher than the surface of the diffuser plate 3 or is coplanar with the surface of the diffuser plate 3. Next, as shown in FIG. 1 and FIG. 4, a film unit M is arranged on the diffuser plate 3. The film unit M has a positioning portion M0, which is a lug-shaped structure and extending into the concave portion 223 of the curvature fixing member 22, thereby achieving the effect of positioning the film unit M.

Referring to FIG. 3, the pressing portion 222 of the curvature fixing member 22 extends along an extending direction away from the main body portion 221. The overlapping width of the pressing portion 222 and the diffuser plate 3 in the extending direction is greater than the width of a gap between the diffuser plate 3 and the side wall portion 212 of the back frame 21. For example, the gap may be caused by manufacturing tolerances, assembly tolerances between different components, or the gap between the diffuser plate 3 and the side wall portion 212 due to thermal expansion and contraction.

In this preferred embodiment, the curvature fixing member 22 is arranged below the overall structure (that is, the industry is commonly known as the ground side). The diffuser plate 3 is positioned through the cooperation of the first positioning structure 23 provided on the curvature fixing member 22 and the second positioning structure 31 of the diffuser plate 3. In this way, the positioning elements arranged around the backlight module in the prior art to fix the diffuser plate 3 can be omitted, so it can better meet the requirements of the narrow bezel. The structural strength of the curvature fixing member 22 is greater than that of the diffuser plate 3, so the diffuser plate 3 can be effectively suppressed to form the same curvature as the curvature fixing member 22, and the curvature of the diffuser plate 3 can be stably maintained. Therefore, the rebound of the diffuser plate 3 can be avoided from affecting the optical quality.

Figure 5:
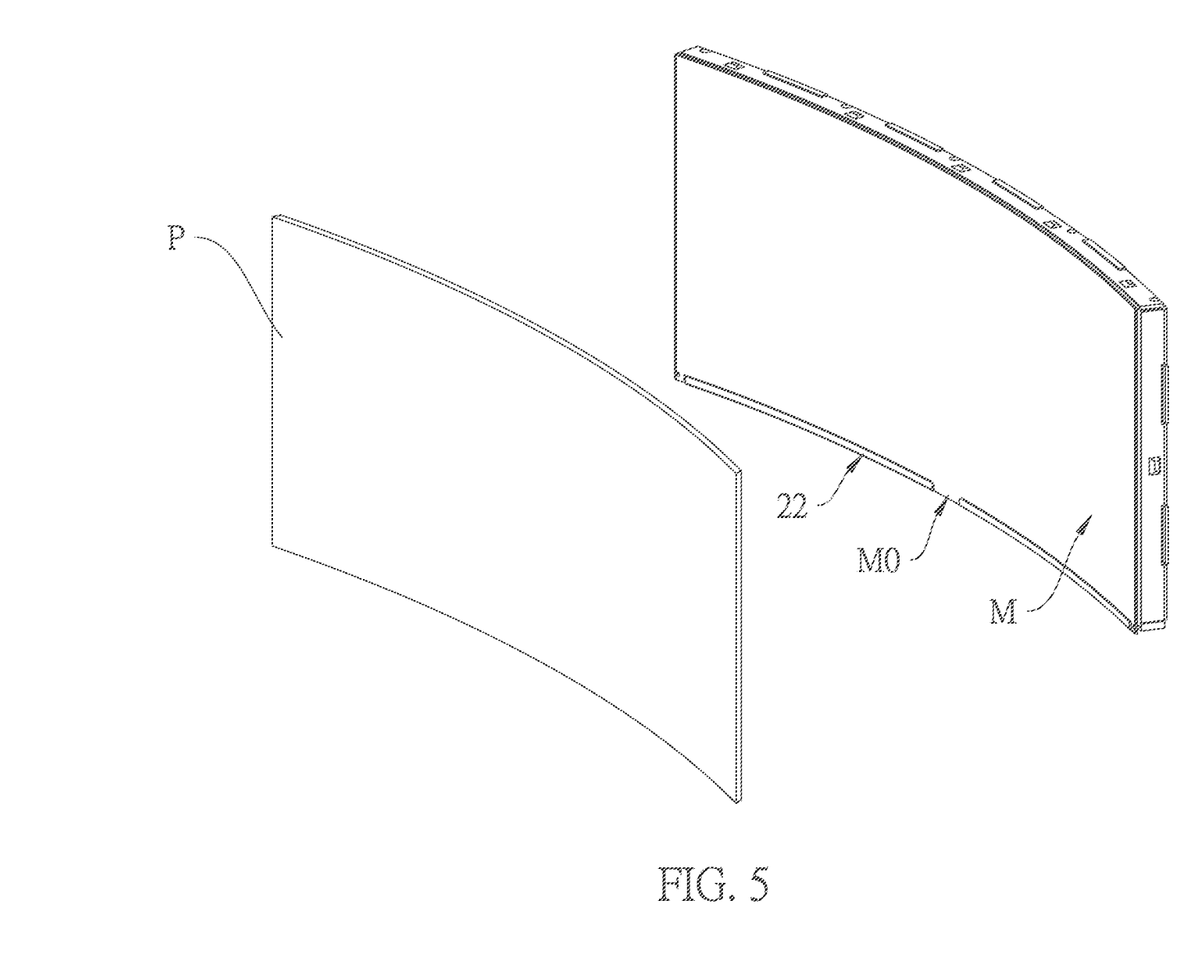
FIG. 5 is an exploded diagram of a display device according to a preferred embodiment of this invention.

Referring to FIG. 5, a display panel P is disposed on the curved surface backlight module to be a display device.

Figure 6:
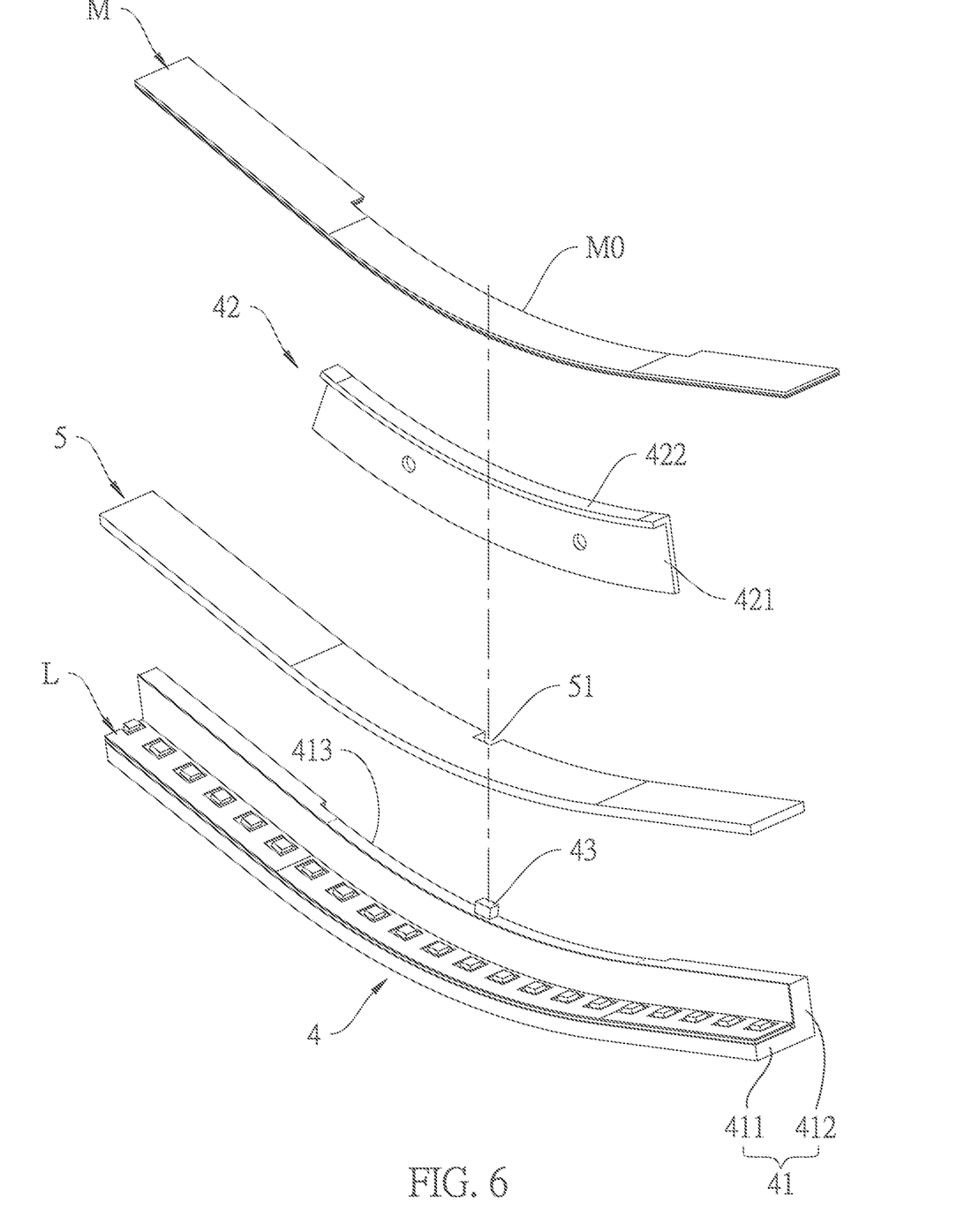
FIG. 6 is an exploded diagram of a curved backlight module according to a second preferred embodiment of this invention.

Referring to FIG. 6, it is a second preferred embodiment of a curved backlight module of the present invention. The curved backlight module comprises a frame unit 4, a diffuser plate 5, a light source L, and a film unit M. It should be noted that, in this preferred embodiment, the aforementioned components are only partially displayed.

The frame unit 4 includes a back frame 41, a curvature fixing member 42 combined with the back frame 41, and a first positioning structure 43. The back frame 41 has a plate body portion 411, and a side wall portion 412 disposed on a periphery of the plate body portion 411. The light source L is carried on the plate body portion 411. The diffuser plate 5 is carried on the side wall portion 412 and located at the light emitting side of the light source L.

The curvature fixing member 42 has a main body portion 421, and a pressing portion 422 extending from the main body portion 421. In this embodiment, the first positioning structure 43 is disposed on the side wall portion 412 of the back frame 41 and is a protrusion structure protruding toward the diffuser plate 5. In addition, the diffuser plate 5 has a second positioning structure 51, which is in the shape of a groove recessed inward from an edge of the diffuser plate 5.

Figure 7:
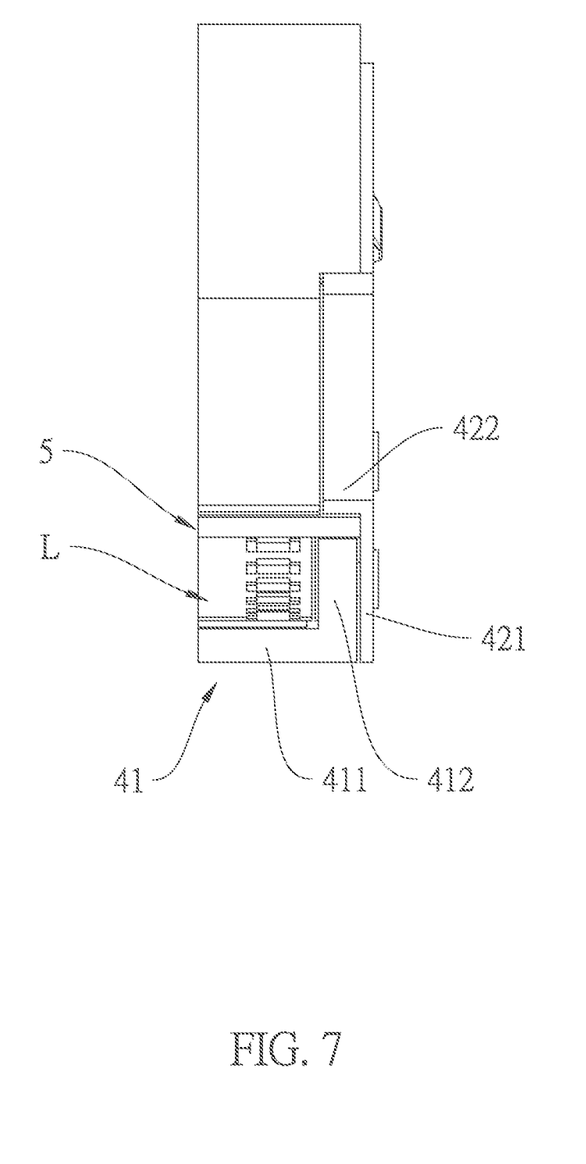
FIG. 7 is a side sectional diagram illustrating the assembled state form of FIG. 6.

When assembling the curved backlight module, the diffuser plate 5 is placed on the side wall portion 412 of the back frame 41 first, and then the curvature fixing member 42 is combined on the diffuser plate 5. More specifically, when the diffuser plate 5 is combined with the back frame 41, the second positioning structure 51 of the diffuser plate 5 is aligned with the first positioning structure 43 on the side wall portion 412 of the back frame 41. The first positioning structure 43 and the second positioning structure 51 are concavo-convex designed to limit each other and position the diffuser plate 5. Then, the curvature fixing member 42 is combined on the back frame 41. For example, methods such as screwing, riveting, buckling or sticking can be used, but not limited to the aforementioned methods. In this embodiment, an accommodating groove 413 is formed on the outer side of the side wall portion 412 of the back frame 41 and has a volume sufficient to accommodate the curvature fixing member 42. Then the film unit M is arranged on the diffuser plate 5. The film unit M has a positioning portion M0. The positioning portion M0 is a groove structure, and the groove structure corresponds to the pressing portion 422 of the curvature fixing member 42, thereby achieving the effect of positioning the film unit M. As shown in FIG. 7, when the curvature fixing member 42 is combined with the back frame 41, the main body portion 421 of the curvature fixing member 42 is attached to the outside of the side wall portion 412 of the back frame 41. At the same time, the pressing portion 422 of the curvature fixing member 42 presses the diffuser plate 5 on a top edge of the side wall portion 412, so that the pressed part of the diffuser plate 5 forms the same curvature as the curvature fixing member 42.

Through the structure of the curvature fixing member 42, the diffuser plate 5 can be stably pressed to form the same curvature as the curvature fixing member 42. In this way, the curvature of the pressed area of the diffuser plate 5 can be stably maintained to avoid affecting the optical quality due to the rebound of the diffuser plate 5. In addition, in this preferred embodiment, the curvature fixing member 42 can only be applied to a part of a display device that needs to be curved, such as the two sides of an instrument panel. Furthermore, in this preferred embodiment, the structure of the curvature fixing member 42 is more simplified, which can reduce the manufacturing cost.

Figure 8:
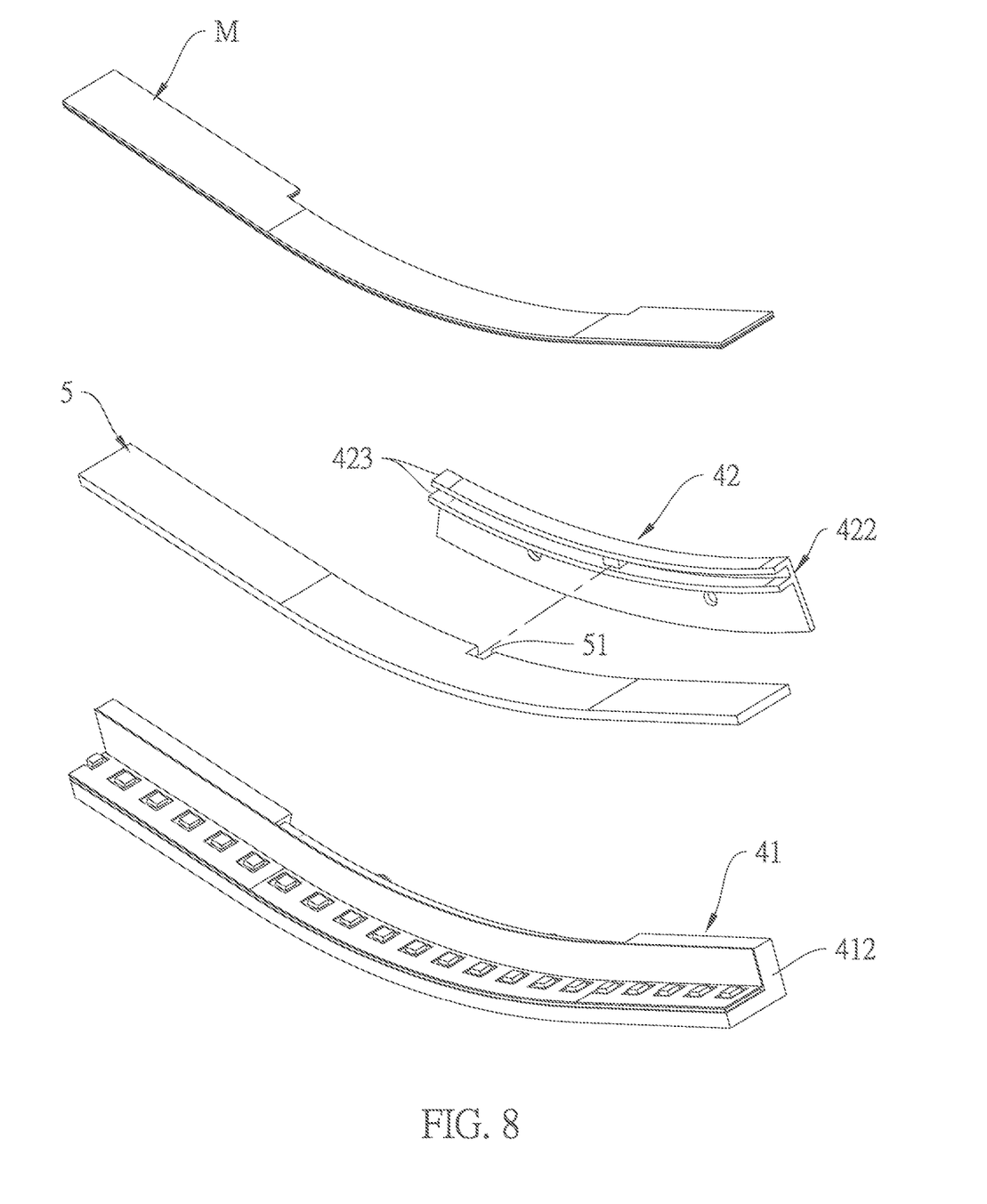
FIG. 8 is an exploded diagram illustrating a variation of the second preferred embodiment of the curved backlight module.
Figure 9:
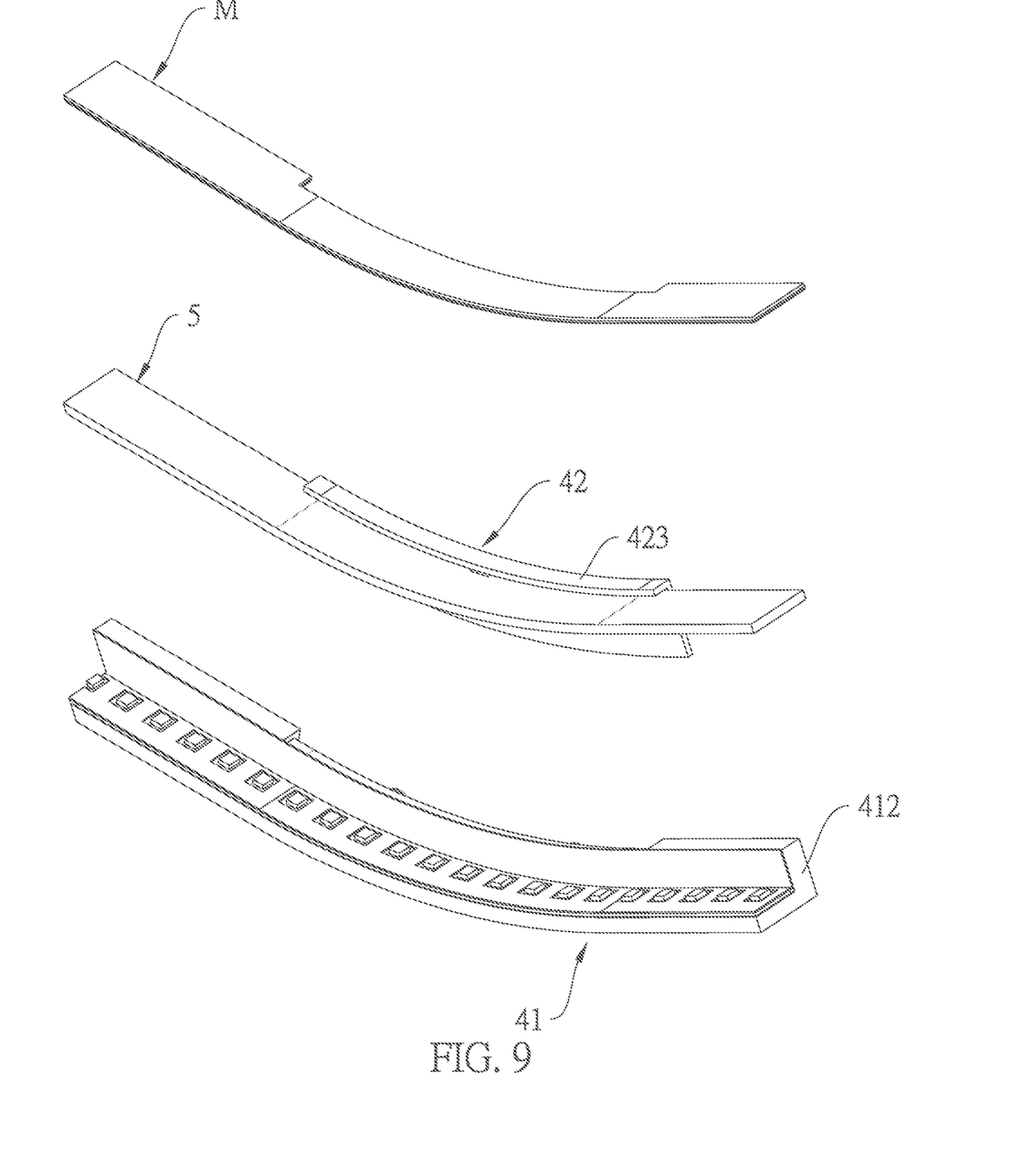
FIG. 9 is an exploded diagram illustrating the combination of a curvature fixing member and a diffuser plate in FIG. 8.

Referring to FIG. 8, it is a variation of the second preferred embodiment. The pressing portion 422 of the curvature fixing member 42 has two layers of sheets 423 spaced apart from each other. The first positioning structure 43 is a protrusion structure and is disposed between the two sheets 423. The second positioning structure 51 of the diffuser plate 5 is in the shape of a groove recessed from an edge of the diffuser plate 5 inwardly. When assembling, the edge of the diffuser plate 5 is placed between the two sheets 423 of the curvature fixing member 42, and the first positioning structure 43 and the second positioning structure 51 are positioned in a concave-convex manner. The curvature fixing member 42 is used to make the part of the diffuser plate 5 to form the same curvature with the curvature fixing member 42, as shown in FIG. 9. Next, the curvature fixing member 42 and the part of the diffuser plate 5 that curved by the curvature fixing member 42 are combined with the side wall portion 412 of the back frame 41. Then the film unit M is disposed on the diffuser plate 5. Such a variation form can make the diffuser plate 5 form a specific curvature before assembly, which can effectively avoid the rebound of the diffuser plate 5 in the subsequent assembly process and improve assembly efficiency.

Figure 10:
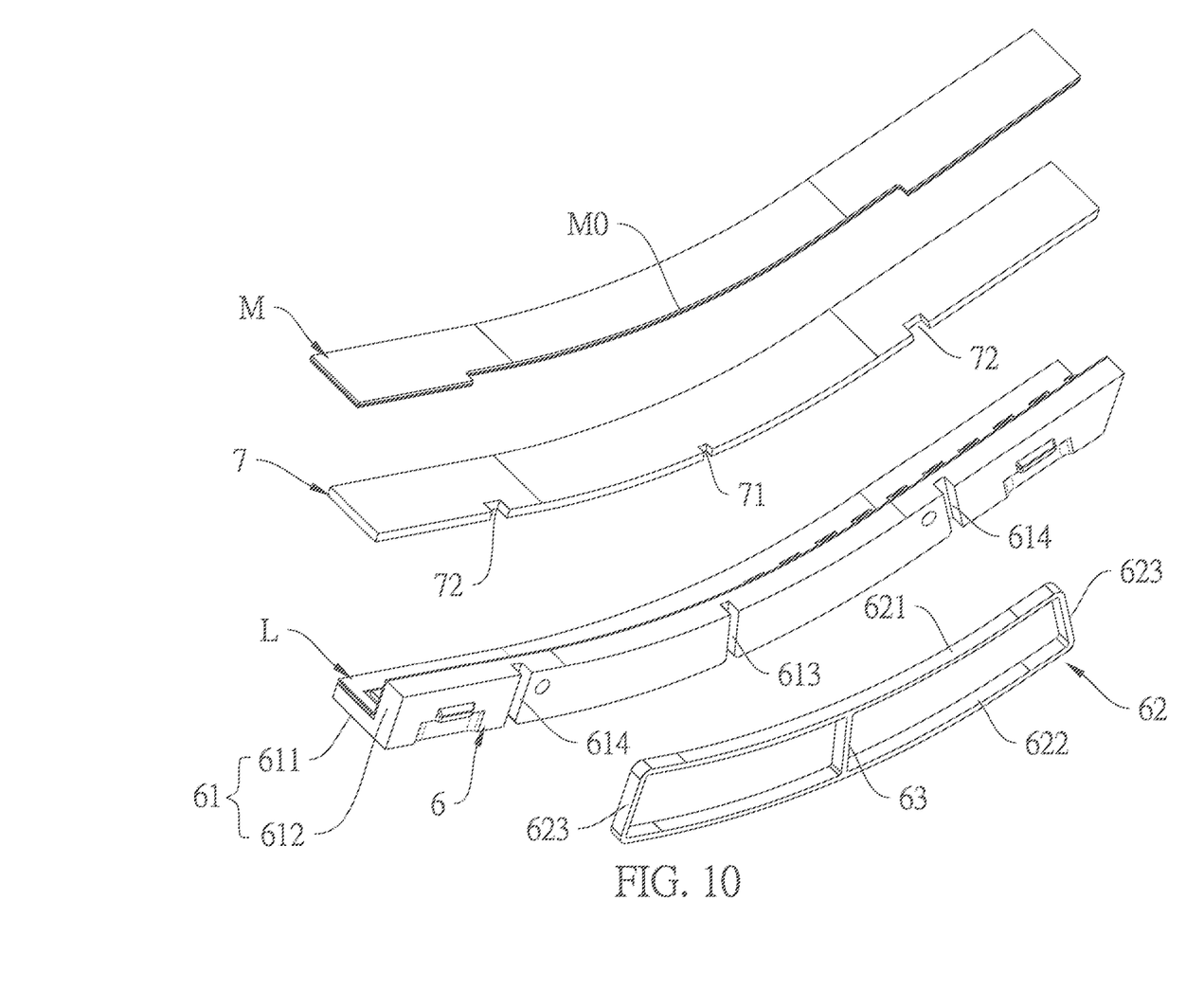
FIG. 10 is an exploded diagram of a curved backlight module according to a third preferred embodiment of this invention.

Referring to FIG. 10, it is a third preferred embodiment of a curved backlight module of the present invention. The curved backlight module comprises a frame unit 6, a diffuser plate 7, a light source L, and a film unit M. It should be noted that, in this preferred embodiment, the aforementioned components are only partially displayed.

The frame unit 6 includes a back frame 61, a curvature fixing member 62 combined with the back frame 61, and a first positioning structure 63. The back frame 61 has a plate body portion 611, and a side wall portion 612 disposed on a periphery of the plate body portion 611. The light source L is carried on the plate body portion 611. The diffuser plate 7 is carried on the side wall portion 612 and located at the light emitting side of the light source L.

The curvature fixing member 62 has an upper frame segment 621 corresponding to a top edge of the side wall portion 612, a lower frame segment 622 corresponding to a bottom edge of the side wall portion 612, and two reinforcing segments 623 respectively connected to two ends of the upper frame segment 621 and two ends of the lower frame segment 622. In this embodiment, the first positioning structure 63 is preferably connected to the central position of the upper frame segment 621 and the lower frame segment 622 relative to the two reinforcing segments 623. The diffuser plate 7 has a second positioning structure 71 and two auxiliary positioning structures 72 located on both sides of the second positioning structure 71. The second positioning structure 71 and the auxiliary positioning structures 72 are in the shape of a groove recessed inward from the edge of the diffuser plate 7. The side wall portion 612 of the back frame 61 has an engaging groove 613 corresponding to the second positioning structure 71, and two channels 614 located on both sides of the engaging groove 613. The two channels 614 are corresponding to the two auxiliary positioning structures 72 respectively.

Figure 11:
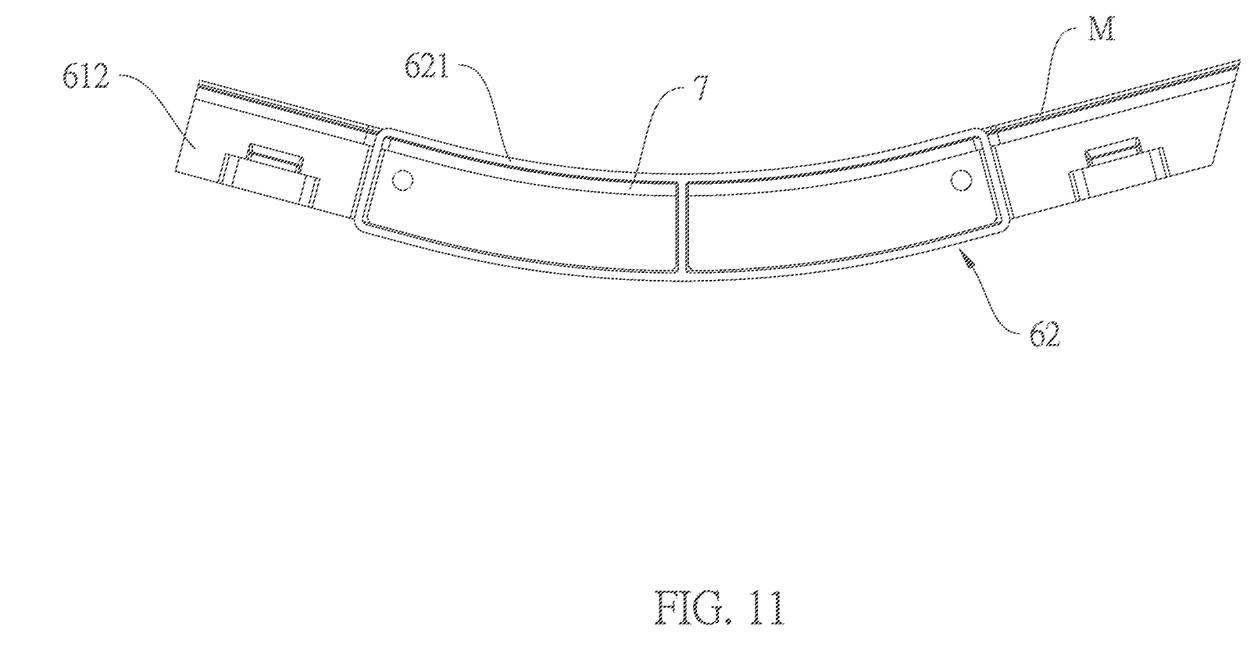
FIG. 11 is a side view diagram illustrating the assembled state of FIG. 10.

When this present preferred embodiment is assembled, the diffuser plate 7 is first placed on the side wall portion 612 of the back frame 61, the second positioning structure 71 is aligned with the engaging groove 613, and the two auxiliary positioning structures 72 are aligned with the two channels 614. Next, the curvature fixing member 62 is combined with the diffuser plate 7 and the side wall portion 612 of the back frame 61. At this time, the first positioning structure 63 is embedded in the second positioning structure 71 and the engaging groove 613, and the two reinforcing segments 623 of the curvature fixing member 62 are respectively accommodated in the two channels 614 of the side wall portion 612. Then the film unit M is arranged on the diffuser plate 7. The film unit M has a positioning portion M0, which is a groove structure corresponding to the upper frame segment 621 of the curvature fixing member 62, thereby achieving the effect of positioning the film unit M. After the assembly is completed, as shown in FIG. 11, the upper frame segment 621 of the curvature fixing member 62 press the diffuser plate 7 against the top edge of the side wall portion 612. Therefore, a uniform pressing effect is provided on the part of the diffuser plate 7 that needs to be formed into a curved shape.

Figure 12:
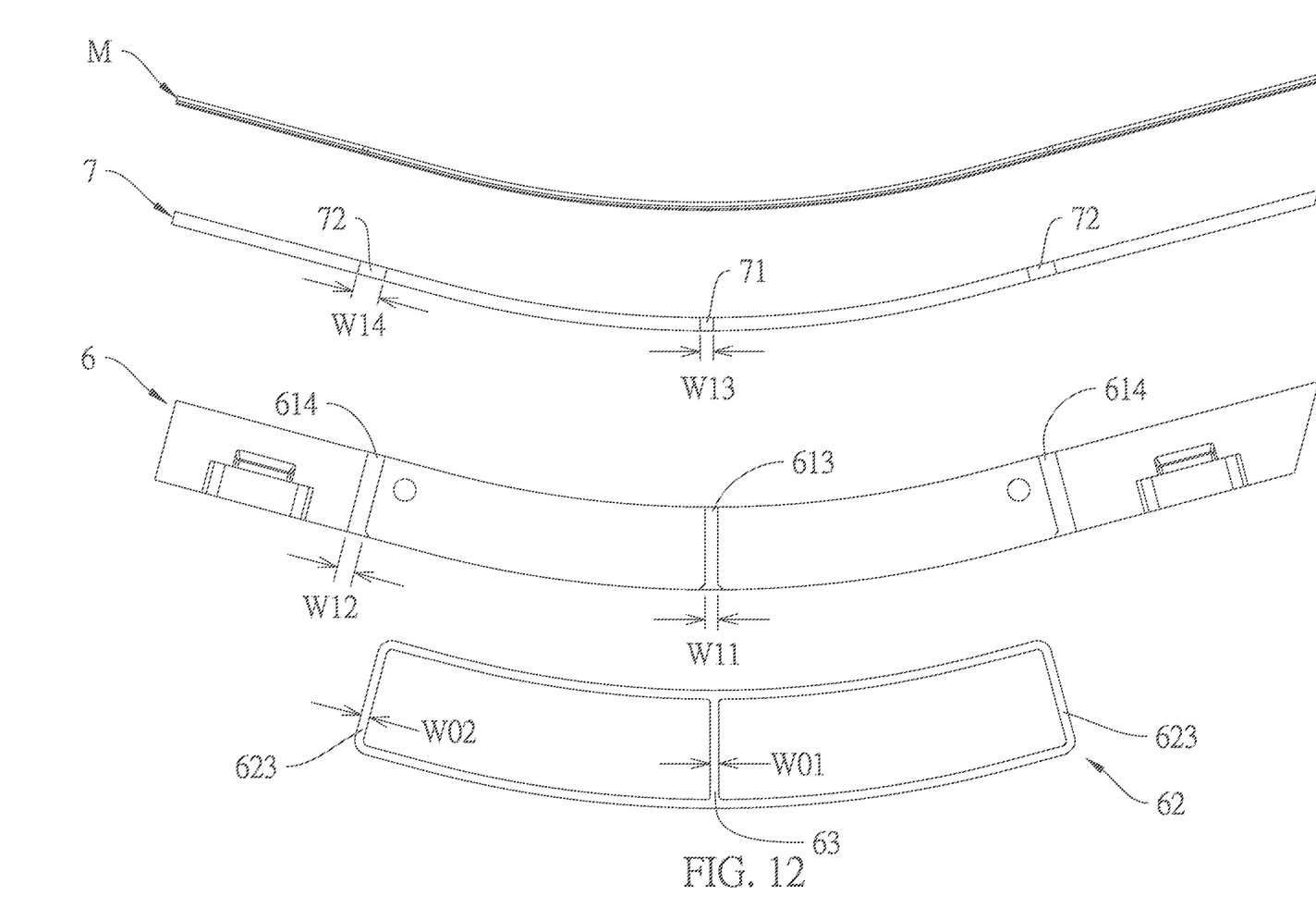
FIG. 12 is a side view diagram illustrating another angle of FIG. 10.

It should be particularly noted that, as shown in FIG. 12, under normal temperature conditions, the first positioning structure 63 has a first structural width W01, and the reinforcing segment 623 of the curvature fixing member 62 has a second structural width W02. The engaging groove 613 of the back frame 61 has a first notch width W11, the channel 614 of the back frame 61 has a second notch width W12, the second positioning structure 71 of the diffuser plate 7 has a third notch width W13, and the auxiliary positioning structure 72 of the diffuser plate 7 has a fourth notch width W14. Wherein, for the back frame 61, the width difference between the first notch width W11 and the first structure width W01 is preferably smaller than the width difference between the second notch width W12 and the second structure width W02. For the diffuser plate 7, the width difference between the third notch width W13 and the first structure width W01 is preferably smaller than the width difference between the fourth notch width W14 and the second structure width W02. Through the above design, the first positioning structure 63 can precisely align the back frame 61 and the diffuser plate 7. In addition, in case of thermal expansion, the diffuser plate 7 can take the second positioning structure 71 as a reference point, and the space of the fourth notch width W14 can be used to accommodate the expansion of the two sides of the diffuser plate 7. In this way, damage to the diffuser plate 7 due to heat expansion and contraction can be avoided.

The frame-shaped structure of the curvature fixing member 62 has better structural strength through the reinforcing segments 623 on both sides, which helps to stably maintain the curvature of the diffuser plate 7. At the same time, the curvature fixing member 62 is embedded within the side wall portion 612 of the back frame 61, which can also reduce the thickness of the side wall portion 612 and is beneficial to the design of a narrow bezel.

To sum up, in the curved backlight module and the display device of the present invention, the effect of positioning and suppressing the diffuser plate can be achieved simultaneously through the structural design of the curvature fixing member. Therefore, the elements arranged around the whole structure for positioning the diffuser plate in the prior art can be omitted, and which can meet the requirement of narrow bezel. In addition, the curvature fixing member can adjust the curvature of the whole or part of the curved backlight module according to different configurations of the curved backlight module.

Although the present invention has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A curved backlight module, comprising:
   a frame unit, including a back frame, a curvature fixing member combined with the back frame, and at least one first positioning structure, the at least one first positioning structure is arranged on the back frame or the curvature fixing member;
   a light source, carried on the back frame; and
   a diffuser plate, carried on the back frame and located on the light emitting side of the light source, and the curvature fixing member presses the diffuser plate so that at least a portion of the diffuser plate forms the same curvature as the curvature fixing member,
   wherein the diffuser plate has at least one second positioning structure, and the at least one first positioning structure of the frame unit is combined with the at least one second positioning structure of the diffuser plate to limit the diffuser plate;
   wherein the back frame has a plate body portion carrying the light source, and a side wall portion arranged on a periphery of the plate body portion for carrying the diffuser plate, the curvature fixing member has an upper frame segment corresponding to a top edge of the side wall portion, the upper frame segment of the curvature fixing member press the diffuser plate against the top edge of the side wall portion, the at least one first positioning structure is connected to the upper frame segment, the at least one second positioning structure of the diffuser plate is in the shape of a groove recessed from the edge of the diffuser plate inwardly, and the at least one first positioning structure is assembled in the at least one second positioning structure.

2. The curved backlight module as claimed in claim 1, wherein the curvature fixing member has a main body portion arranged outside the side wall portion of the back frame, and the upper frame segment extends from the main body portion.

3. The curved backlight module as claimed in claim 2, wherein at least one first positioning structure is a protrusion structure located on the main body portion or the upper frame segment of the curvature fixing member and protruding toward the diffuser plate and extending into the at least one second positioning structure.

4. The curved backlight module as claimed in claim 1, wherein the curvature fixing member has a concave portion, the surface of the concave portion is not higher than the surface of the diffuser plate or is coplanar with the surface of the diffuser plate, and the curved backlight module further comprising a film unit stacked on the diffuser plate, and the film unit has a positioning portion extending in the concave portion.

5. The curved backlight module as claimed in claim 1, wherein the number of the first positioning structure is one, and the first positioning structure is corresponding to a central position of a curved section which is formed on the back frame.

6. The curved backlight module as claimed in claim 2, wherein the at least one first positioning structure is a protrusion structure located on the side wall portion of the back frame and protruding toward the diffuser plate and extending into the at least one second positioning structure.

7. The curved backlight module as claimed in claim 2, wherein the upper frame segment of the curvature fixing member has two layers of sheets spaced apart from each other, and the at least one first positioning structure is a protrusion structure arranged between the two sheets, the edge of the diffuser plate is extended between the two sheets of the curvature fixing member, and the at least one first positioning structure is extended into the at least one second positioning structure.

8. The curved backlight module as claimed in claim 2, wherein the upper frame segment of the curvature fixing member extends along an extending direction away from the main body portion, and the width of the upper frame segment overlapping with the diffuser plate in the extending direction is greater than the width of a gap between the diffuser plate and the side wall portion of the back frame.

9. The curved backlight module as claimed in claim 1, wherein the curvature fixing member further has a lower frame segment corresponding to a bottom edge of the side wall portion, the at least one first positioning structure is connected to a central position of the upper frame segment and a central position of the lower frame segment, the side wall portion of the back frame has at least one engaging groove corresponding to the at least one second positioning structure, and the at least one first positioning structure is embedded in the at least one second positioning structure and the at least one engaging groove.

10. The curved backlight module as claimed in claim 9, wherein the curvature fixing member further has two reinforcing segments respectively connected to two ends of the upper frame segment and two ends of the lower frame segment, the side wall portion of the back frame further has two channels respectively located on both sides of the at least one engaging groove, the diffuser plate further has two auxiliary positioning structures respectively located on both sides of the at least one second positioning structure and corresponding to the two channels, and the two reinforcing segments of the curvature fixing member are respectively accommodated in the two channels and the two auxiliary positioning structures.

11. The curved backlight module as claimed in claim 10, wherein the at least one first positioning structure has a first structure width, the reinforcing segment of the curvature fixing member has a second structural width, the engaging groove of the back frame has a first notch width, each of the channels of the back frame has a second notch width, and the difference between the first notch width and the first structure width is smaller than the difference between the second notch width and the second structure width.

12. The curved backlight module as claimed in claim 11, wherein the at least one second positioning structure of the diffuser plate has a third notch width, the auxiliary positioning structure of the diffuser plate has a fourth notch width, and the difference between the third notch width and the first structure width is smaller than the difference between the fourth notch width and the second structure width.

13. A display device, comprising the curved backlight module as described in claims 1, and a display panel arranged on the curved backlight module.

* * * * *